(12) United States Patent
Zheng et al.

(10) Patent No.: US 11,395,241 B2
(45) Date of Patent: Jul. 19, 2022

(54) PARAMETER ADJUSTMENT METHOD AND RELATED DEVICE

(71) Applicant: Huawei Technologies Co., Ltd., Shenzhen (CN)

(72) Inventors: Xiaojin Zheng, Shanghai (CN); Yusun Fu, Shenzhen (CN); Xun Zhou, Chengdu (CN); Siduo Shen, Shanghai (CN); Ziyu Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 16/905,690

(22) Filed: Jun. 18, 2020

(65) Prior Publication Data
US 2020/0322902 A1    Oct. 8, 2020

Related U.S. Application Data

(63) Continuation of application No. PCT/CN2017/118315, filed on Dec. 25, 2017.

(51) Int. Cl.
*H04W 52/36* (2009.01)
*H04L 5/00* (2006.01)
*H04L 5/10* (2006.01)
*H04W 52/24* (2009.01)
*H04W 52/42* (2009.01)
*H04W 64/00* (2009.01)

(52) U.S. Cl.
CPC ......... *H04W 52/367* (2013.01); *H04L 5/0051* (2013.01); *H04L 5/10* (2013.01); *H04W 52/241* (2013.01); *H04W 52/42* (2013.01); *H04W 64/003* (2013.01)

(58) Field of Classification Search
None
See application file for complete search history.

(56) References Cited

U.S. PATENT DOCUMENTS

2007/0270175 A1* 11/2007 Malladi ............... H04W 52/343
                                                          455/522
2010/0029212 A1*  2/2010 Malladi ................. H04W 52/08
                                                          455/63.1

(Continued)

FOREIGN PATENT DOCUMENTS

CN    102045724 A    5/2011
CN    102118842 A    7/2011

(Continued)

*Primary Examiner* — Gregory B Sefcheck
*Assistant Examiner* — Suk Jin Kang
(74) *Attorney, Agent, or Firm* — Slater Matsil, LLP

(57) ABSTRACT

A wireless transmission parameter adjustment method and a related device. The method includes monitoring a frequency parameter of a cell, determining, in response to detecting that the frequency parameter of the cell increases, a location relationship between a first terminal and an access network device, wherein the first terminal is a terminal camping on the cell, and adjusting a target power parameter of the first terminal according to the location relationship between the first terminal and the access network device, so that a radio remote unit power does not exceed a preset power, where the target power parameter is a power parameter other than a cell-specific reference signal power.

11 Claims, 7 Drawing Sheets

Parameter adjustment system

(56) References Cited

U.S. PATENT DOCUMENTS

| | | | |
|---|---|---|---|
| 2011/0111766 A1* | 5/2011 | Yang | H04W 52/247 |
| | | | 455/452.2 |
| 2011/0017496 A1 | 7/2011 | Fong et al. | |
| 2013/0109432 A1* | 5/2013 | Yang | H04W 52/241 |
| | | | 455/522 |
| 2015/0029882 A1* | 1/2015 | Yang | H04L 1/1692 |
| | | | 370/252 |
| 2015/0078300 A1* | 3/2015 | Xu | H04W 24/08 |
| | | | 370/329 |
| 2015/0201381 A1* | 7/2015 | Shin | H04W 52/146 |
| | | | 455/522 |
| 2016/0165546 A1* | 6/2016 | Sun | H04W 52/343 |
| | | | 370/229 |
| 2017/0289921 A1* | 10/2017 | Kim | H04W 72/0473 |
| 2017/0295515 A1* | 10/2017 | Madan | H04W 28/04 |
| 2018/0035389 A1* | 2/2018 | Hessler | H04W 52/38 |
| 2018/0077580 A1* | 3/2018 | Madan | H04W 28/04 |
| 2018/0262958 A1* | 9/2018 | Melin | H04W 36/0085 |
| 2018/0310258 A1* | 10/2018 | Goria | H04W 24/02 |
| 2018/0324705 A1* | 11/2018 | Yu | H04L 1/0003 |
| 2019/0021061 A1* | 1/2019 | Shin | H04W 52/06 |
| 2019/0312714 A1* | 10/2019 | Nakamura | H04L 5/0096 |
| 2019/0387443 A1* | 12/2019 | Huang | H04W 48/16 |
| 2020/0128476 A1* | 4/2020 | Huang | H04W 4/06 |

FOREIGN PATENT DOCUMENTS

| | | |
|---|---|---|
| CN | 103249131 A | 8/2013 |
| CN | 104918275 A | 9/2015 |
| JP | 2015154184 A | 8/2015 |
| WO | 2013000305 A1 | 1/2013 |
| WO | 2015077931 A1 | 6/2015 |

\* cited by examiner

PARAMETER ADJUSTMENT METHOD AND RELATED DEVICE

CROSS-REFERENCE TO RELATED APPLICATIONS

This application is a continuation of International Application No. PCT/CN2017/118315, filed on Dec. 25, 2017, the disclosure of which is hereby incorporated by reference in its entirety.

TECHNICAL FIELD

The present invention relates to the field of communications technologies, and in particular, to a parameter adjustment method and a related device.

BACKGROUND

In a mobile communications network, a cell-specific reference signal (CRS) is introduced to facilitate downlink channel quality measurement and channel estimation, and is used for coherent detection and demodulation on a user equipment (UE, User Experience) side. A CRS power is related to cell coverage. A larger CRS power indicates larger cell coverage, and a smaller CRS power indicates smaller cell coverage.

A radio remote unit (RRU) is a basic function module of a base station, and may implement conversion from a baseband signal to a radio frequency signal of a radio interface. When an RRU power is fixed, the CRS power cannot exceed the RRU power. Therefore, if a frequency parameter of the cell (for example, a cell bandwidth) increases, the CRS power needs to be reduced to ensure that a total RRU power does not exceed a threshold.

However, the CRS power is related to the cell coverage, and if the CRS power is reduced, the cell coverage shrinks.

SUMMARY

A technical problem to be resolved in this application is how to ensure cell coverage when an RRU power is fixed.

Using an example in which a frequency parameter is a cell bandwidth, when the RRU power is fixed, a maximum transmit power of a cell is fixed, and the maximum transmit power cannot exceed the RRU power. In addition, the maximum transmit power of the cell is in a positive correlation with the cell bandwidth and a CRS power. Therefore, when the cell bandwidth increases, it can be ensured, by reducing the CRS power, that the RRU power does not exceed a threshold. However, the cell coverage shrinks due to the reduction of the CRS power.

A first aspect of embodiments of the present invention discloses a parameter adjustment method, applied to an access network device, where the method includes monitoring a frequency parameter of a cell corresponding to the access network device, if it is detected that the frequency parameter of the cell increases, determining a location relationship between a first terminal camping on the cell and the access network device, and adjusting a target power parameter of the first terminal based on the location relationship between the first terminal and the access network device, so that an RRU power does not exceed a preset power, where the target power parameter is a power parameter other than a CRS power.

It can be learned that, according to the implementation of the first aspect, when the frequency parameter increases, the target power parameter other than the CRS power can be adjusted based on the location relationship between the first terminal and the access network device. This ensures that the RRU power does not exceed a threshold, and ensures that the CRS power does not change, thereby ensuring cell coverage.

In a feasible implementation, the determining a location relationship between a terminal in a terminal set and the access network device may include obtaining a channel quality parameter (CQI) of the first terminal, and determining the location relationship between the first terminal and the access network device based on the channel quality parameter.

It can be learned that, according to the optional implementation, the access network device may determine a distance between the first terminal and the access network device based on the channel quality parameter fed back by the first terminal, and does not need to obtain real-time location coordinates of the first terminal, thereby improving efficiency of determining the location relationship by the access network device.

In a feasible implementation, the determining, by the access network device, the location relationship between the first terminal and the access network device based on the channel quality parameter may include if the channel quality parameter of the first terminal is greater than a first preset parameter threshold, determining that a value of a distance between the first terminal and the access network device is less than a first preset distance threshold, that is, the first terminal is a near point terminal, if the channel quality parameter of the first terminal is greater than a second preset parameter threshold and less than or equal to the first preset parameter threshold, determining that a value of a distance between the first terminal and the access network device is greater than or equal to the first preset distance threshold and less than or equal to a second preset distance threshold, that is, the first terminal is a medium or near point terminal, or if the channel quality parameter of the first terminal is less than or equal to the second preset parameter threshold, determining that a value of a distance between the first terminal and the access network device is greater than or equal to the second preset distance threshold, that is, the first terminal is a far point terminal.

It can be learned that, according to the feasible implementation, the access network device can accurately determine, based on a correspondence between a value of the channel quality parameter and a location of the first terminal, whether the first terminal is the near point terminal, the medium or near point terminal, or the far point terminal, thereby improving efficiency of determining the location relationship by the access network device.

In a feasible implementation, the target power parameter may include a transmit power spectral density. The adjusting a target power parameter of the first terminal based on the location relationship between the first terminal and the access network device may include if the value of the distance between the first terminal and the access network device is less than the first preset distance threshold, that is, the first terminal is the near point terminal, a value of the CRS power may not be changed while the transmit power spectral density of the first terminal is reduced, so that the RRU power does not exceed the preset power.

The transmit power spectral density is a transmit power spectral density of a physical downlink shared channel (PDSCH). A PDSCH power is a product of the transmit power spectral density and the frequency parameter. For an orthogonal frequency division multiplexing (OFDM) symbol with a CRS signal, a total power of the OFDM symbol is a sum of the CRS power and the PDSCH power, and the total power of the OFDM symbol is determined by the RRU power.

It can be learned that, according to the optional implementation, when the frequency parameter of the cell (for example, a cell bandwidth) increases, more bandwidth resources can be used and the RRU power can be kept not exceeding the threshold by keeping the CRS power unchanged and reducing the transmit power spectral density.

In a feasible implementation, the target power spectral parameter may further include a user-level parameter and/or a demodulation reference signal power.

The adjusting a target power parameter of the first terminal based on the location relationship between the first terminal and the access network device may include if the value of the distance between the first terminal and the access network device is greater than or equal to the second preset distance threshold and less than a third preset distance threshold, that is, the first terminal is the medium or near point terminal, adjusting the user-level parameter and/or the demodulation reference signal power of the first terminal based on a transmission mode of the first terminal.

It can be learned that the access network device may adjust the user-level parameter (PA) or the demodulation reference signal (DMRS) power for the medium or near point terminal, so that when the frequency parameter increases, the access network device can use more bandwidth resources while the RRU power does not exceed the threshold and the CRS power is unadjusted, thereby ensuring that the cell coverage does not shrink.

In an optional implementation, the adjusting the user-level parameter and/or the demodulation reference signal power of the first terminal based on a transmission mode of the first terminal includes if the transmission mode of the first terminal is a transmission mode without the demodulation reference power, adjusting the user-level parameter, or if the transmission mode of the first terminal is a transmission mode with the demodulation reference power, adjusting the demodulation reference signal power.

When the first terminal is the medium or near point terminal, a modulation order of the first terminal is higher than a modulation order of quadrature phase shift keying (QPSK). In this case, when demodulation is performed for the first terminal, an accurate value of an offset of a PDSCH subcarrier power relative to the CRS power needs to be known, and the accurate value is related to the user-level parameter. In the transmission mode without the demodulation parameter signal (for example, an R8 mode), delivering the user-level parameter is a necessary operation for reducing the transmit power spectral density. Therefore, the transmit power spectral density can be reduced by adjusting the user-level parameter, thereby ensuring that the RRU power does not exceed the threshold, and the cell coverage does not shrink.

In an embodiment, if the user-level parameter changes, the access network device may notify the first terminal by using RRC reconfiguration signaling.

In the transmission mode with the demodulation parameter signal (for example, a TM9 mode), a ratio of the demodulation reference signal (DMRS) power to the PDSCH power is fixed. By adjusting the DMRS power, the PDSCH power can be adjusted, thereby ensuring that the RRU power does not exceed the threshold, and the cell coverage does not shrink.

In some feasible implementations, the adjusting, by the access network device, a target power parameter of the first terminal based on the location relationship between the first terminal and the access network device may include if the value of the distance between the first terminal and the access network device is greater than or equal to the third preset distance threshold, that is, the first terminal is the far point terminal, increasing the transmit power spectral density of the first terminal.

For the far point terminal, the transmit power spectral density is increased while an actual transmit bandwidth is reduced, thereby ensuring that the RRU power does not exceed the threshold.

According to a second aspect, this application provides an access network device, and the access network device may include a plurality of function modules, configured to correspondingly perform the method provided in the first aspect, or the method provided in any one of the possible implementations of the first aspect.

According to a third aspect, this application provides an access network device, configured to perform the parameter adjustment method described in the first aspect. The access network device may include a memory, a processor, and a transceiver. The transceiver is configured to communicate with another communications device (such as a first terminal). The memory is configured to store code for implementing the parameter adjustment method described in the first aspect. The processor is configured to execute the program code stored in the memory, to be specific, perform the method provided in the first aspect, or the method provided in any one of the possible implementations of the first aspect.

According to a fourth aspect, a computer-readable storage medium is provided. The readable storage medium stores program code for implementing the parameter adjustment method provided in the first aspect, or the parameter adjustment method provided in any one of the possible implementations of the first aspect. The program code includes an executable instruction for running the parameter adjustment method provided in the first aspect, or the parameter adjustment method provided in any one of the possible implementations of the first aspect.

According to a fifth aspect, a computer program product is provided. When the computer program product is run on a computer, the computer is enabled to perform the parameter adjustment method in the first aspect and the possible method implementations of the first aspect.

According to a sixth aspect, a communications apparatus is provided, including a processing element and a storage element. The storage element is configured to store a program, and when invoked by the processing element, the program is used to perform the method provided in the first aspect or the method provided in any one of the possible implementations of the first aspect.

DETAILED DESCRIPTION OF ILLUSTRATIVE EMBODIMENTS

The following describes embodiments of the present invention with reference to the accompanying drawings in the embodiments of the present invention.

For ease of better understanding a parameter adjustment method and a related device that are provided in the embodiments of the present invention, the following first describes a system architecture related in this application.

Figure 1:
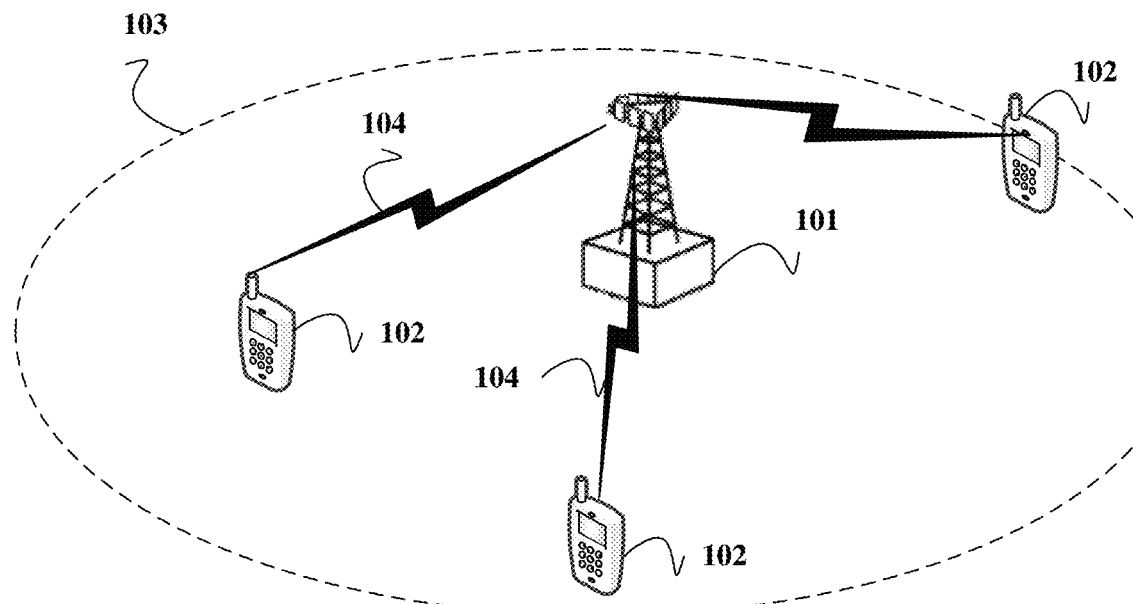
FIG. 1 is a schematic architectural diagram of a parameter adjustment system according to an embodiment of the present invention.

FIG. 1 is a schematic architectural diagram of a parameter adjustment system according to an embodiment of the present invention.

The parameter adjustment system may not be limited to a long term evolution (LTE) mobile communications system, a future evolved fifth generation (5G) mobile communications system, a new radio (NR) system, a machine to machine (M2M) communications system, or the like. As shown in FIG. 1, the parameter adjustment system may include an access network device 101 and one or more first terminals 102.

The access network device 101 may be a base station, and the base station may be configured to communicate with one or more first terminals, or may be configured to communicate with one or more base stations that have some terminal functions (for example, communication between a macro base station and a micro base station such as an access point). The base station may be a base transceiver station (BTS) in a time division synchronous code division multiple access (TD-SCDMA) system, or may be an evolved NodeB (Evolutional Node B, eNodeB) in the LTE system, or may be a base station in the 5G system or the new radio (NR) system. Alternatively, the base station may be an access point (AP), a transmission node (Trans TRP), a central unit (CU), or another network entity, and may include some or all of the foregoing network entities.

Specifically, the access network device 101 may include two basic function modules a building baseband unit (BBU) and a remote radio unit RRU. The BBU may implement functions such as a baseband processing function (coding, multiplexing, modulation, spread spectral, or the like), signaling processing, and local and remote operation and maintenance that are of a Uu interface, and a working status monitoring function and an alarm information reporting function of the access network device. The RRU may be configured to perform modulation and demodulation for optical transmission, digital up- and down-frequency conversion, A/D conversion, and the like, and may be configured to complete functions including conversion from an intermediate frequency signal to a radio frequency signal, and transmission of the radio frequency signal by using an antenna port.

One BBU can support a plurality of RRUs. Cell setting may be performed on a control board of the BBU. Some RRUs may be connected to one BBU. Coverage of a signal of an RRU may form one cell, or coverage of signals of a plurality of RRUs may form one cell. This is not limited in this embodiment of the present invention. In FIG. 1, a cell 103 may correspond to one RRU, or may correspond to a plurality of RRUs. However, for ease of description below, an example in which the cell 103 corresponds to one RRU is used in the following description process. However, it should be known that in some embodiments, the cell 103 may further correspond to a plurality of RRUs.

The first terminal 102 may be a terminal camping on the cell 103. In an embodiment, the first terminal 102 may be located everywhere in a parameter adjustment system. The first terminal 102 may be classified into a near point terminal, a medium or near point terminal, and a far point terminal based on a location relationship between the first terminal 102 and the access network device 101. In some embodiments of this application, the first terminal 102 may be stationary, for example, a desktop computer, or a fastened mainframe computer, or may be mobile, for example, a mobile device, a mobile station, a mobile unit, an M2M terminal, a radio unit, a remote unit, a user agent, or a mobile client.

In an embodiment, the access network device 101 may be configured to communicate with the first terminal 102 by using a radio interface 104.

Figure 2:
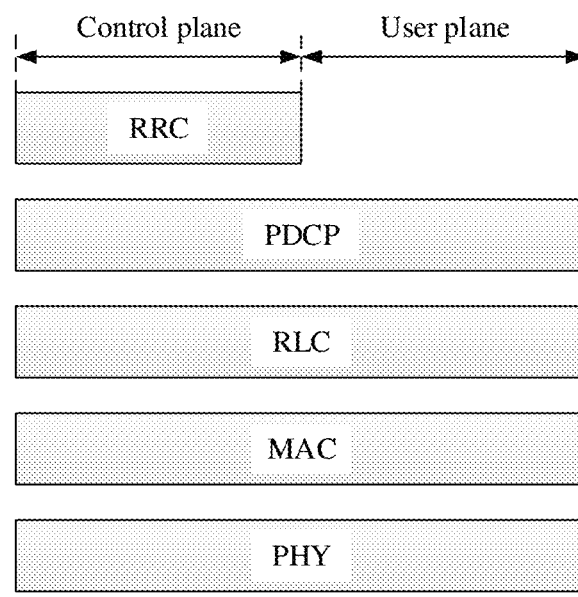
FIG. 2 is a schematic diagram of a scenario of radio interface protocol layers according to an embodiment of the present invention.

FIG. 2 is a schematic diagram of a scenario of radio interface protocol layers according to an embodiment of the present invention. An interface between the radio interface protocol layers shown in FIG. 2 may be represented as a channel, and may specifically include a logical channel, a transport channel, and a physical channel.

(1) A physical layer (PHY) performs specific signal transmission through the physical channel. The physical channel corresponds to a set of resource elements (RE) that carry higher layer information. Basic entities included in the physical channel include a resource element (RE) and a resource block (RB).

In an embodiment, the physical channel may include a PDCCH (Physical Downlink Control Channel), a PDSCH (Physical Downlink Shared Channel), a PBCH (Physical Broadcast Channel), a PMCH (Physical Multicast Channel), a PHICH (Physical Hybrid ARQ Indicator Channel, physical H-ARQ indicator channel), a PUSCH (Physical Uplink Shared Channel), a PRACH (Physical Random Access Channel), and the like. This is not limited in this embodiment of the present invention.

(2) An interface between the PHY layer and a media access control (MAC) layer is a transport channel. The PHY layer provides a service for the MAC layer through the transport channel.

In an embodiment, the transport channel may include a DL-SCH (Downlink Shared Channel), a BCH (Broadcast Channel), an MCH (Multicast Channel), a PCH (Paging Channel), and a UL-SCH (Uplink Shared Channel), a RACH (Random Access Channel), and the like. This is not limited in this embodiment of the present invention.

(3) An interface between the media access control (MAC) layer and a radio link control (RLC) layer is a logical channel. The MAC layer may provide a service for the RLC layer through the logical channel.

In an embodiment, the logical channel may include a PCCH (Paging Control Channel), a CCCH (Common Control Channel), a DCCH (Dedicated Control Channel), a DTCH (Dedicated Traffic Channel), and the like. This is not limited in this embodiment of the present invention.

Based on the embodiment corresponding to the foregoing parameter adjustment system, an embodiment of the present invention provides a parameter adjustment method.

An inventive principle of this application may include that the access network device may allocate a power to each channel based on an RRU power and according to a preset rule, for example, the PDCCH or the PDSCH channel (where this embodiment of the present invention mainly relates to the PDSCH channel, and the following uses the PDSCH channel as an example for description).

In time domain, a power that can be obtained by each OFDM symbol may be determined by the RRU power.

Figure 3:
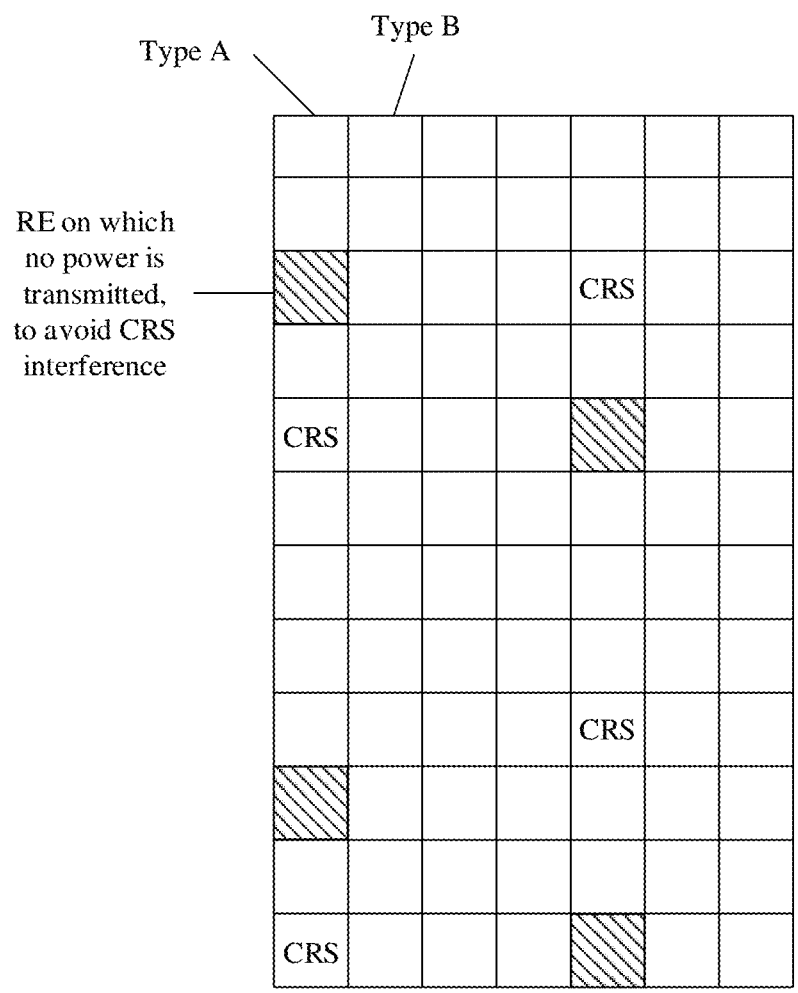
FIG. 3 is a schematic diagram of an OFDM symbol according to an embodiment of the present invention.

Referring to FIG. 3, OFDM symbols on the PDSCH channel may be classified, depending on whether a CRS signal exists in an OFDM symbol, into two types: a type A PDSCH OFDM (TypeA) symbol and a type B PDSCH OFDM (TypeB) symbol. Each box may be used to represent one RE, and all boxes shown in FIG. 3 may represent one RB.

(1) TypeA: indicating a PDSCH OFDM symbol without the CRS signal. PDSCH OFDM symbols in the second column, the third column, and the fourth column in FIG. 3 are all TypeA symbols. A TypeA power may meet the following formula:

$$P_{TypeA} = P_{CRS} \rho_A N_{PDSCH}^A K_A$$

where $P_{TypeA}$ indicates a TypeA power, $P_{CRS}$ indicates a power on each RE (namely, EPRE, Energy Per Resource Element) of the CRS signal, $\rho_A$ indicates a ratio of a data channel power on a TypeA symbol to $P_{CRS}$, $N_{PDSCH}^A$ indicates a quantity of PDSCH subcarriers on each RE of the TypeA symbols, and $K_A$ indicates a quantity of RBs.

2) TypeB: indicating a PDSCH OFDM symbol with the CRS signal. To avoid interference generated by the CRS signal, a blank RE may be set, namely, an RE on which no power is transmitted. PDSCH OFDM symbols in the first column and the fifth column in FIG. 3 are all TypeB symbols. A power of a TypeB symbol may meet the following formula:

$$P_{TypeB} = P_{CRS} N_{CRS} N_{BW} + P_{CRS} \rho_A N_{PDSCH}^B K_A$$

where $P_{TypeB}$ indicates the TypeB power, $P_{CRS}$ indicates the EPRE of the CRS signal, $\rho_B$ indicates a ratio of a data channel power on a TypeB symbol to $P_{CRS}$, $N_{PDSCH}^B$ indicates a quantity of PDSCH subcarriers on each RE of the TypeB symbols, $K_B$ indicates a quantity of RBs, $N_{BW}$ indicates a quantity of RBs corresponding to a cell bandwidth, and $N_{CRS}$ indicates a quantity of CRS subcarriers on each RB of the TypeB symbols.

The TypeB power is a sum of a CRS power (including EPREs of a plurality of CRSs) and a PDSCH power (including powers of a plurality of REs that do not have the CRS signal and on which the powers can be transmitted). When the power of the TypeB symbol is fixed, it can be ensured that the CRS power is unchanged by ensuring that the PDSCH power is unchanged.

In an embodiment, the PDSCH power may be a product of a transmit power spectral density and a frequency parameter, the transmit power spectral density may be a transmit power spectral density of the PDSCH, and the frequency parameter may be a bandwidth. If the frequency parameter changes, the PDSCH power may be kept unchanged by adjusting the transmit power spectral density.

In an embodiment, delivering a user-level parameter PA is a necessary operation for reducing the transmit power spectral density. Therefore, the transmit power spectral density can be reduced by adjusting the user-level parameter PA, thereby keeping the PDSCH power unchanged.

In an embodiment, a ratio of a demodulation reference signal (DMRS) power to the PDSCH power is fixed. By adjusting the DMRS power, the PDSCH power may keep unchanged when the frequency parameter changes.

It should be noted that the foregoing invention principle is merely used for explanation and should not constitute a limitation.

It should be noted that, for definitions of concepts such as a resource element (Resource Element, RE), a resource block (Resource Block, RB), a symbol (symbol), and a subcarrier in this application, refer to an LTE standard. However, the definitions are not limited to the LTE standard. The definitions of the foregoing concepts in future communications standards may be different.

Based on the foregoing main inventive principle, the following describes method embodiments of a parameter adjustment method provided in this application. It should be noted that the method embodiments in this application may be applied to an access network device, and the access network device includes but is not limited to an example of the access network device in FIG. 1.

Figure 4:
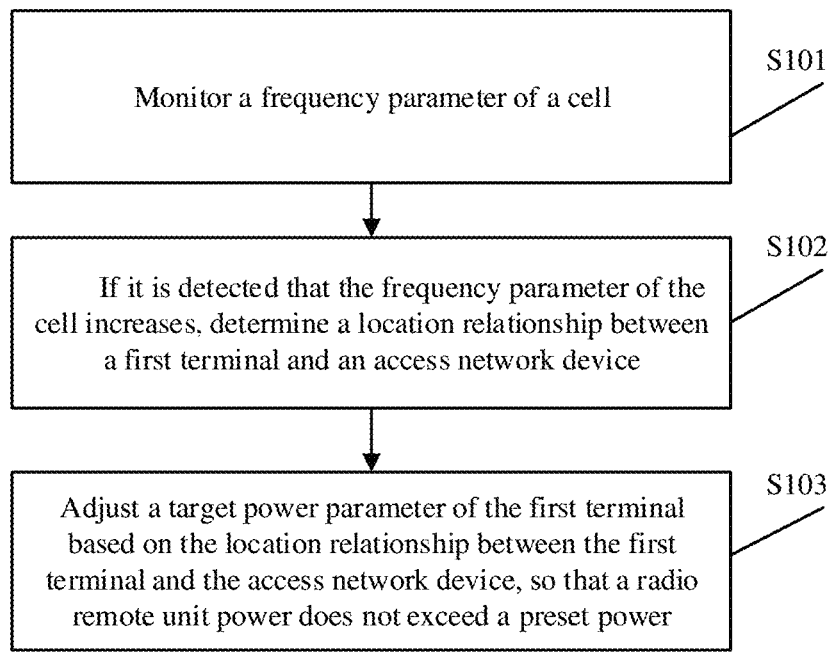
FIG. 4 is a schematic flowchart of a parameter adjustment method according to an embodiment of the present invention.

FIG. 4 is a schematic flowchart of a parameter adjustment method according to an embodiment of the present invention. The parameter adjustment method in FIG. 4 may include the following steps.

S101: Monitor a frequency parameter of a cell.

It should be noted that the cell may be a cell corresponding to the access network device, namely, coverage of a signal of the access network device. The access network device may include a BBU unit and an RRU unit. In an embodiment, the cell may alternatively be coverage of a signal of the RRU.

In an embodiment, the frequency parameter may be a cell bandwidth, or may be an RB resource on a channel, or may be an RE resource on a channel, or the like. This is not limited in the present invention.

In an embodiment, if a spectral resource of a communications operator increases (for example, increases from 15 MHz to 20 MHz), the frequency parameter of the cell (for example, a cell bandwidth) may further increase correspondingly.

S102: If it is detected that the frequency parameter of the cell increases, determine a location relationship between a first terminal and the access network device.

The first terminal is a terminal camping on the cell. There may be a plurality of first terminals, and each terminal camping on the cell may be used as the first terminal.

The access network device may determine the location relationship between the first terminal and the access network device based on a channel quality parameter (CQI) fed back by the first terminal.

Figure 5:
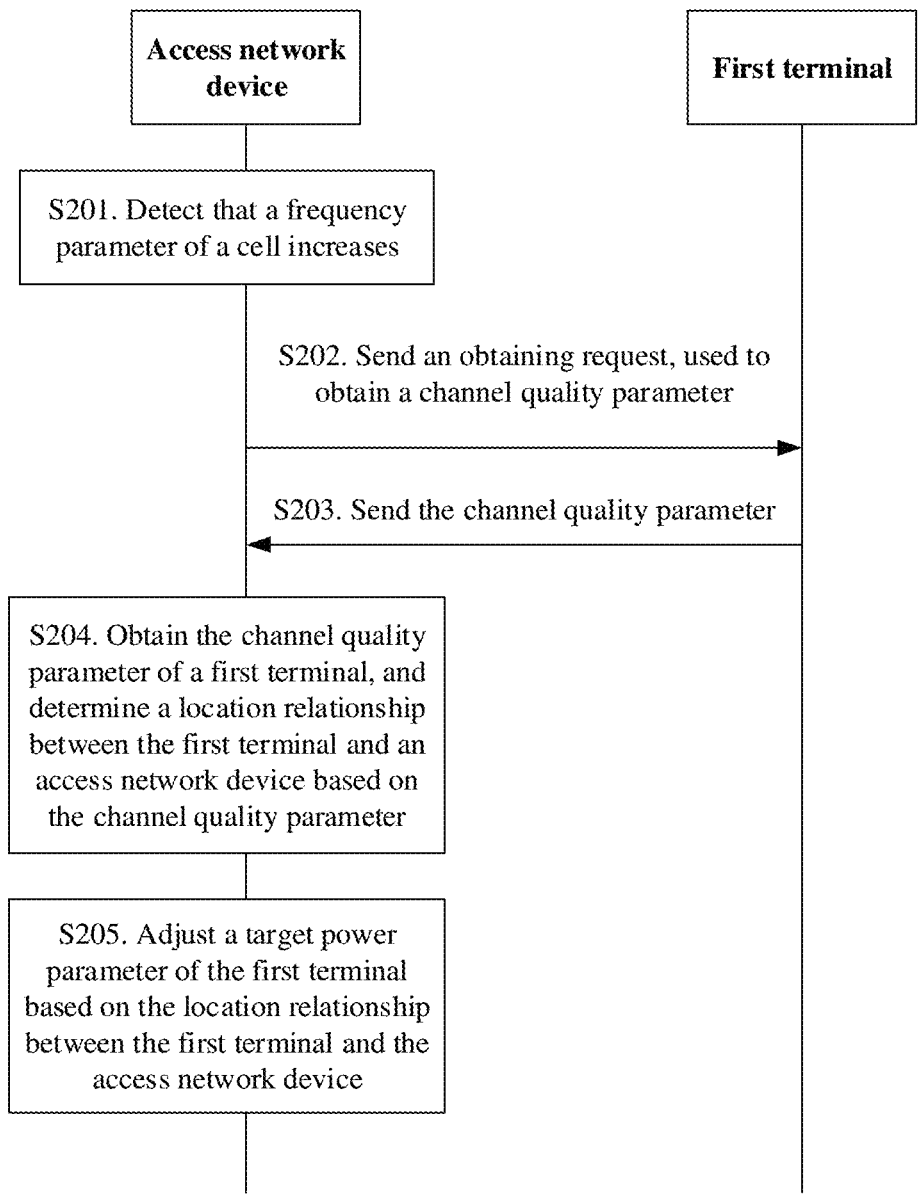
FIG. 5 is a schematic flowchart of another parameter adjustment method according to an embodiment of the present invention.

For example, a manner in which the access network device obtains the channel quality parameter of the first terminal may include steps shown in FIG. 5. In FIG. 5, the access network device may detect that the frequency parameter of the cell increases in S201, and may send an obtaining request to the first terminal in S202. The obtaining request is used to obtain the channel quality parameter of the first terminal.

In S203, the first terminal receives the obtaining request, and sends the channel quality parameter of the first terminal to the access network device.

In an embodiment, the access network device may alternatively directly obtain the channel quality parameter of the first terminal without using the obtaining request. For example, when the first terminal broadcasts the channel quality parameter of the first terminal, the access network device may directly obtain the channel quality parameter of the first terminal.

In S204, the first terminal may obtain the channel quality parameter of the first terminal, and determine the location relationship between the first terminal and the access network device based on the channel quality parameter.

In an embodiment, the determining the location relationship between the first terminal and the access network device based on the channel quality parameter may include if the channel quality parameter of the first terminal is greater than a first preset parameter threshold, determining that a value of a distance between the first terminal and the access network device is less than a first preset distance threshold, if the channel quality parameter of the first terminal is greater than a second preset parameter threshold and less than or equal to the first preset parameter threshold, determining that a value of a distance between the first terminal and the access network device is greater than or equal to the first preset distance threshold and less than or equal to a second preset distance threshold, or if the channel quality parameter of the first terminal is less than or equal to the second preset parameter threshold, determining that a value of a distance between the first terminal and the access network device is greater than or equal to the second preset distance threshold.

It should be noted that the first preset parameter threshold is greater than the second preset parameter threshold, and the first preset distance threshold is less than the second preset parameter threshold.

When the channel quality parameter is very large, for example, the channel quality parameter of the first terminal is greater than the first preset parameter threshold, it may be determined that the first terminal is a near point terminal. In other words, the value of the distance between the first terminal and the access network device is less than the first preset distance threshold.

When the channel quality parameter is at a medium level, for example, the channel quality parameter of the first terminal is greater than the second preset parameter threshold and is less than or equal to the first preset parameter threshold, it may be determined that the first terminal is a medium or near point terminal. In other words, the value of the distance between the first terminal and the access network device is greater than or equal to the first preset distance threshold and less than or equal to the second preset distance threshold.

When the channel quality parameter is relatively low, for example, the channel quality parameter of the first terminal is less than or equal to the second preset parameter threshold, it may be determined that the first terminal is a far point terminal. In other words, the value of the distance between the first terminal and the access network device is greater than or equal to the second preset distance threshold.

S103: Adjust a target power parameter of the first terminal based on the location relationship between the first terminal and the access network device, so that a radio remote unit power does not exceed a preset power.

The remote radio unit is a remote radio unit (RRU) in the access network device, and the preset power is a threshold that a preset RRU power cannot exceed.

It should be noted that the target power parameter of the first terminal is a power parameter other than a cell-specific reference signal power.

In an embodiment, the target power parameter may include a transmit power spectral density, a user-level parameter PA, and a demodulation reference signal power.

The transmit power spectral density may be a transmit power spectral density of a PDSCH.

The user-level parameter PA may be used to measure a relationship between a power of a TypeA symbol and the CRS power. A smaller user-level parameter PA may indicate a smaller power of the TypeA symbols relative to the CRS power.

The demodulation reference signal power is a power value of a demodulation reference signal (DMRS).

In an embodiment, when the frequency parameter of the cell increases, the access network device may adjust the target power parameter based on different location relationships between the access network device and the first terminal, and keep the CRS power unchanged (to be specific, the CRS power is still configured as a power value of a corresponding CRS when the frequency parameter is relatively small). A PDSCH power is adjusted by adjusting the target power parameter, thereby ensuring that the RRU power does not exceed the preset power.

It can be learned that in this embodiment of the present invention, when the frequency parameter of the cell increases, the RRU power determines a maximum transmit power of the cell, and the maximum transmit power of the cell is a sum of powers of OFDM symbols. The PDSCH power can be adjusted by adjusting the target power parameter, thereby ensuring that the RRU power does not exceed a threshold. In addition, the CRS power is controlled to keep unchanged, thereby ensuring cell coverage.

Figure 6:
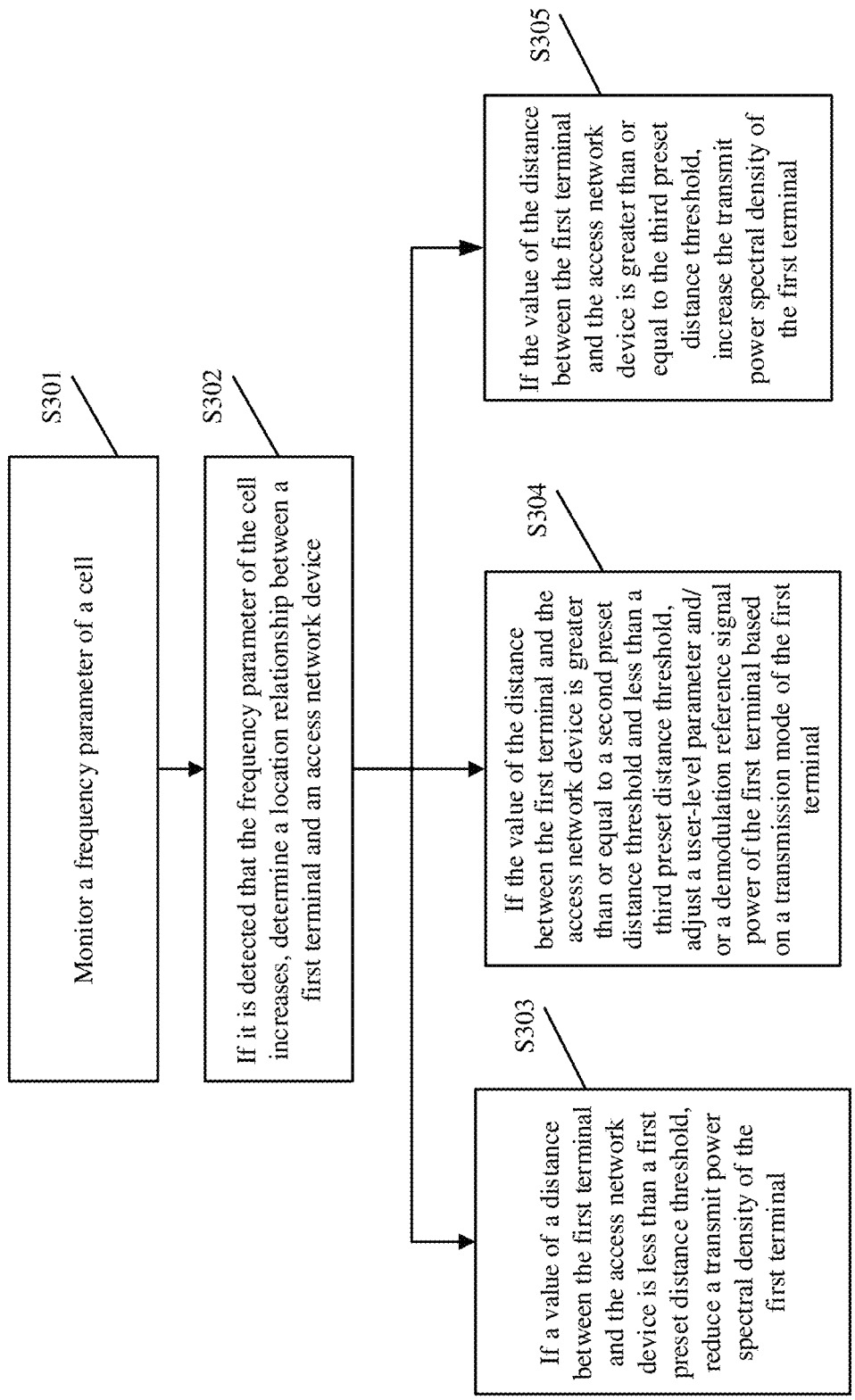
FIG. 6 is a schematic flowchart of still another parameter adjustment method according to an embodiment of the present invention.

FIG. 6 is a schematic flowchart of still another parameter adjustment method according to an embodiment of the present invention. The method shown in FIG. 6 may include the following steps.

S301: Monitor a frequency parameter of a cell.

S302: If it is detected that the frequency parameter of the cell increases, determine a location relationship between a first terminal and an access network device.

The first terminal is a terminal camping on the cell.

It should be noted that for specific implementation processes of S301 and S302, refer to related descriptions of steps S10 and S102 in the foregoing embodiment, and details are not described herein again.

S303: If a value of a distance between the first terminal and the access network device is less than a first preset distance threshold, reduce a transmit power spectral density of the first terminal.

In an embodiment, the target power parameter may include the transmit power spectral density of the first terminal. The transmit power spectral density may be a transmit power spectral density of a PDSCH. The PDSCH power is a product of the transmit power spectral density and the frequency parameter.

If the value of the distance between the first terminal and the access network device is less than the first preset distance threshold, it may indicate that the first terminal is a near point terminal. For the near point terminal, when a total power of OFDM symbols is fixed, if the transmit power spectral density is reduced, more bandwidth resources may be scheduled, that is, more RB resources may be scheduled, thereby increasing an actual transmit bandwidth.

Using an example in which the frequency parameter is a cell bandwidth, and the cell bandwidth may indicate available RB resources. In an embodiment, if there are remaining RB resources, the near point terminal may increase a TB size by reducing the transmit power spectral density and scheduling more RB resources, thereby improving a user throughput.

For example, when detecting that the cell bandwidth increases, the access network device may configure a CRS power to be a corresponding power that a CRS has when the bandwidth is still relatively small, and may reduce the transmit power spectral density, so that the actual transmit bandwidth increases, and a total power of TypeB symbols keeps unchanged, thereby ensuring that a total power of an RRU does not exceed a preset power.

S304: If the value of the distance between the first terminal and the access network device is greater than or equal to a second preset distance threshold and less than a third preset distance threshold, adjust a user-level parameter and/or a demodulation reference signal power of the first terminal based on a transmission mode of the first terminal.

In an embodiment, the target power spectral parameter may include the user-level parameter and/or the demodulation reference signal power.

When the value of the distance between the first terminal and the access network device is greater than or equal to the second preset distance threshold and less than the third preset distance threshold, it may indicate that the first terminal is a medium or near point terminal. For the medium or near point terminal, the user-level parameter PA needs to be delivered or the DMRS power needs to be modified, to reduce the power spectral density.

In an embodiment, the adjusting a user-level parameter and/or a demodulation reference signal power of the first terminal based on a transmission mode of the first terminal includes if the transmission mode of the first terminal is a transmission mode without the demodulation reference power, adjusting the user-level parameter.

When the first terminal is the medium or near point terminal, a modulation order of the first terminal is higher than a modulation order of quadrature phase shift keying (QPSK). In this case, when demodulation is performed for the first terminal, an accurate value of an offset of a PDSCH subcarrier power relative to the CRS power needs to be known, and the accurate value is related to the user-level parameter. In the transmission mode without the demodulation parameter signal (for example, an R8 mode), delivering the user-level parameter is a necessary operation for reducing the transmit power spectral density.

It should be noted that the transmission mode without the demodulation reference power may be, for example, the R8 mode, a TM3 (Transmission Mode 3) mode, or a TM4 (Transmission Mode 4) mode.

In an embodiment, if the user-level parameter changes, the access network device may notify the first terminal by using RRC reconfiguration signaling.

Figure 7:
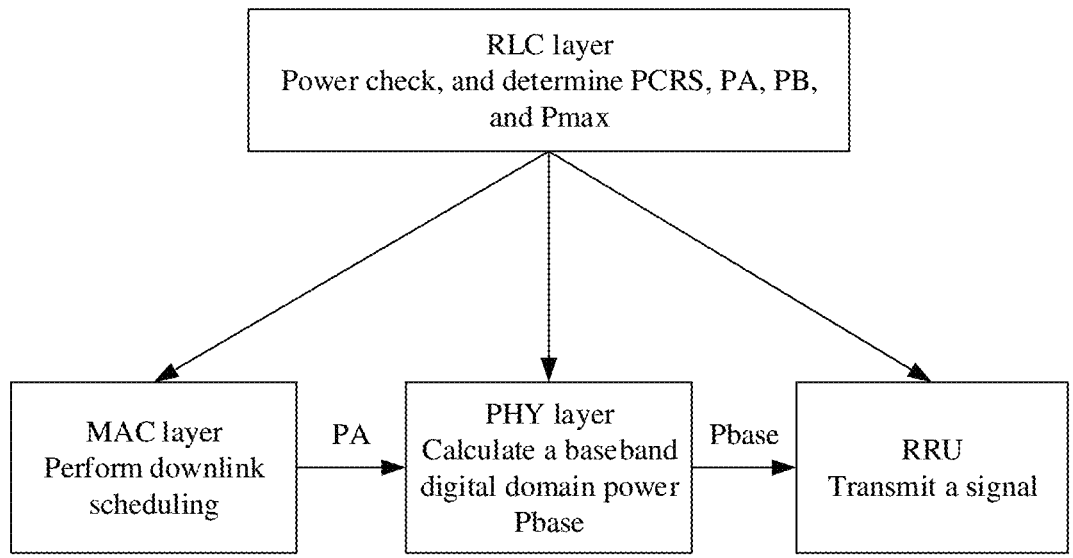
FIG. 7 is a schematic diagram of a scenario in which a power control parameter is transferred for a medium or near point terminal according to an embodiment of the present invention.

For example, FIG. 7 is a schematic diagram of a scenario in which a power control parameter is transferred for a medium or near point terminal according to an embodiment of the present invention. FIG. 7 may be used to represent a transfer relationship of downlink power control parameters between an outside and protocol layers.

$P_{CRS}$ may represent an EPRE on a CRS subcarrier. The user-level parameter PA and a cell-level parameter PB together may determine an offset of the PDSCH power relative to $P_{CRS}$. $P_{max}=\max\{P_{TypeA}, P_{TypeB}\}$ indicates the maximum transmit power of the cell, where $P_{TypeA}$ indicates a power of a TypeA symbol, and $P_{TypeB}$ indicates a power of a TypeB symbol. $RS_{L1}$ may indicate a relative pilot power. Pt indicates a baseband digital domain power. $RS_{L1}$ and $P_{base}$ can be respectively regarded as a normalized representation of $P_{CRS}$ at L1 and a normalized representation of a downlink transmit power at L1.

At an RLC layer, power check can be performed to determine that the maximum transmit power does not exceed an RRU power. Then, the user-level parameter PA, the cell-level parameter PB, the maximum transmit power Pmax of the cell, RS1, and PCRS are obtained through calculation. PA, PB, Pmax, and PCRS are transferred to a MAC layer, RS1 and the cell-level parameter PB are transferred to a PHY layer, and Pmax is transferred to the RRU, so that the RRU transmits a signal.

At the RLC layer, the access network device may adjust the user-level parameter PA based on a baseline scheduling solution, to adjust schedulable resources of the first terminal.

It should be noted that the baseline scheduling solution is a scheduling solution in which a PDSCH subcarrier power is evenly allocated. According to the baseline scheduling solution, the subcarrier power scheduled by different users may be adjusted based on a transmission mode of a user and a channel quality parameter (CQI).

The MAC layer may obtain an adjusted user-level parameter PA based on the baseline scheduling solution and a quick power control (QPC) solution. If the adjusted PA is greater than a transport block size (TB size) of an unadjusted PA, the adjusted user-level parameter PA is transferred to the PHY layer.

In an embodiment, the PDSCH power may be adjusted at the MAC layer. When the first terminal is in the transmission mode with the DMRS (for example, the R8 mode), adjusting the user-level parameter PA is a necessary operation for adjusting the transmit power spectral density. After the user-level parameter PA is adjusted, the first terminal needs to be notified of a PA change by delivering the RRC reconfiguration signaling.

At the PHY layer, the baseband digital domain power Pbase may be obtained by using the user-level parameter PA transferred at the MAC layer, and Pbase is transferred to the RRU, so that the RRU transmits a signal.

In an embodiment, if the transmission mode of the first terminal is a transmission mode with the demodulation reference power, the demodulation reference signal power is adjusted.

The transmission mode with the demodulation reference power may be, for example, a TM9 (Transmission Mode 9) mode.

In the transmission mode with the demodulation parameter signal (for example, the TM9 mode), a ratio of the demodulation reference signal (DMRS) power to the PDSCH power is fixed. By adjusting the DMRS power, the PDSCH power can be adjusted, thereby ensuring that the RRU power does not exceed a threshold, and cell coverage does not shrink.

S305: If the value of the distance between the first terminal and the access network device is greater than or equal to the third preset distance threshold, increase the transmit power spectral density of the first terminal.

It should be noted that when the value of the distance between the first terminal and the access network device is greater than or equal to the third preset distance threshold, it may indicate that the first terminal is a far point terminal.

For the far point terminal, increasing the transmit power spectral density can reduce scheduled RB resources, and reduce the actual transmit bandwidth. Therefore, it can be ensured that the PDSCH power keeps unchanged, thereby ensuring that the RRU power does not exceed the preset power.

In an embodiment, the far point terminal may increase the TB size by reducing the scheduled RB resources, thereby improving the user throughput.

In an embodiment, the RB resources increased by the near point terminal and the RB resources decreased by the far point terminal are controlled, so that when the frequency parameter increases, it can be ensured that the CRS power keeps unchanged, and the RRU power does not exceed the preset power.

It can be learned that, according to this embodiment of the present invention, when the first terminal and the access network device have different location relationships, the target power spectral parameters may be adjusted in different manners. This ensures that when the frequency parameter of the cell increases, the cell coverage does not shrink, and the RRU power does not exceed the preset power.

Figure 8:
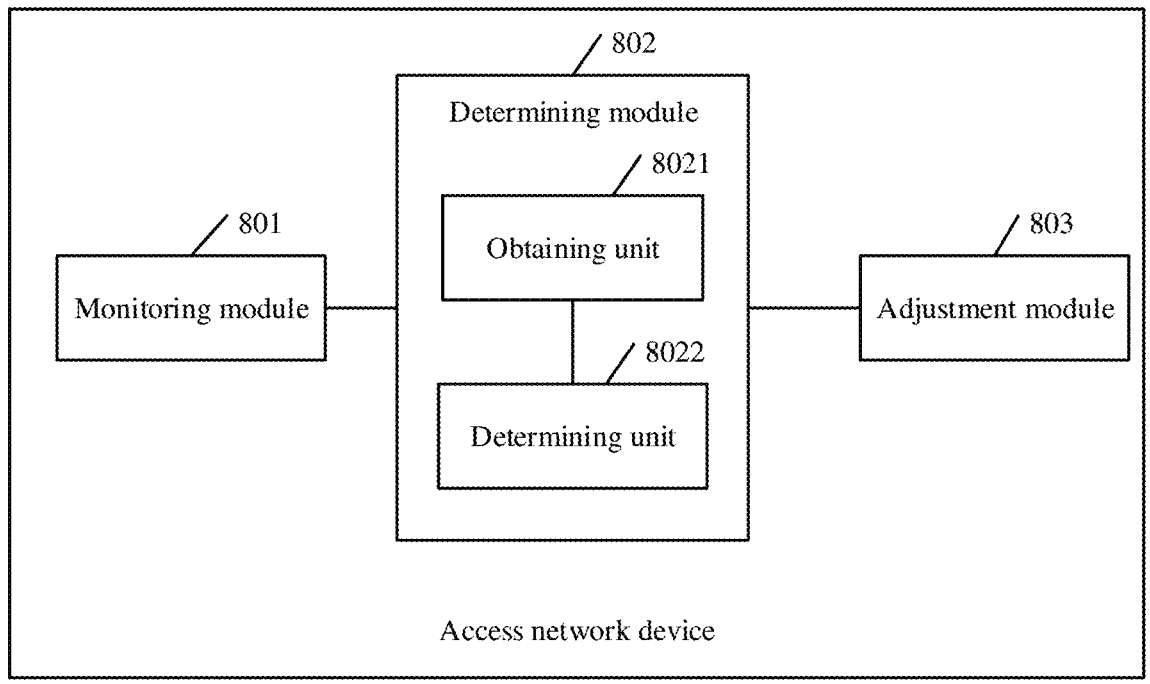
FIG. 8 is a schematic structural diagram of an access network device according to an embodiment of the present invention.

The method in the embodiments of the present invention is described in detail above. For ease of better implementation of the foregoing solutions in the embodiments of the present invention, a corresponding apparatus embodiment is correspondingly described in the following. Specifically, FIG. 8 is a schematic structural diagram of an access network device according to an embodiment of the present invention. The access network device may include a monitoring module 801, configured to monitor a frequency parameter of a cell, a determining module 802, configured to if it is detected that the frequency parameter of the cell increases, determine a location relationship between a first terminal and the access network device, where the first terminal is a terminal camping on the cell, and an adjustment module 803, configured to adjust a target power parameter of the first terminal based on the location relationship between the first terminal and the access network device, so that a radio remote unit power does not exceed a preset power, where the target power parameter is a power parameter other than a cell-specific reference signal power.

In an embodiment, the determining module 802 includes an obtaining unit 8021, configured to obtain a channel quality parameter of the first terminal, and a determining unit 8022, configured to determine the location relationship between the first terminal and the access network device based on the channel quality parameter.

In an embodiment, the determining unit 8022 is specifically configured to if the channel quality parameter of the first terminal is greater than a first preset parameter threshold, determine that a value of a distance between the first terminal and the access network device is less than a first preset distance threshold, if the channel quality parameter of the first terminal is greater than a second preset parameter threshold and less than or equal to the first preset parameter threshold, determine that a value of a distance between the first terminal and the access network device is greater than or equal to the first preset distance threshold and less than or equal to a second preset distance threshold, or if the channel quality parameter of the first terminal is less than or equal to the second preset parameter threshold, determine that a value of a distance between the first terminal and the access network device is greater than or equal to the second preset distance threshold.

In an embodiment, the target power parameter includes a transmit power spectral density.

The adjustment module 803 is specifically configured to if the value of the distance between the first terminal and the access network device is less than the first preset distance threshold, reduce the transmit power spectral density of the first terminal.

In an embodiment, the target power spectral parameter includes a user-level parameter and/or a demodulation reference signal power.

The adjustment module 803 is specifically configured to if the value of the distance between the first terminal and the access network device is greater than or equal to a second preset distance threshold and less than a third preset distance threshold, adjust the user-level parameter and/or the demodulation reference signal power of the first terminal based on a transmission mode of the first terminal.

In an embodiment, the adjustment module 803 is specifically configured to if the transmission mode of the first terminal is a transmission mode without the demodulation reference power, adjust the user-level parameter, or if the transmission mode of the first terminal is a transmission mode with the demodulation reference power, adjust the demodulation reference signal power.

In an embodiment, the adjustment module 803 is specifically configured to if the value of the distance between the first terminal and the access network device is greater than or equal to the third preset distance threshold, increase the transmit power spectral density of the first terminal.

Figure 9:
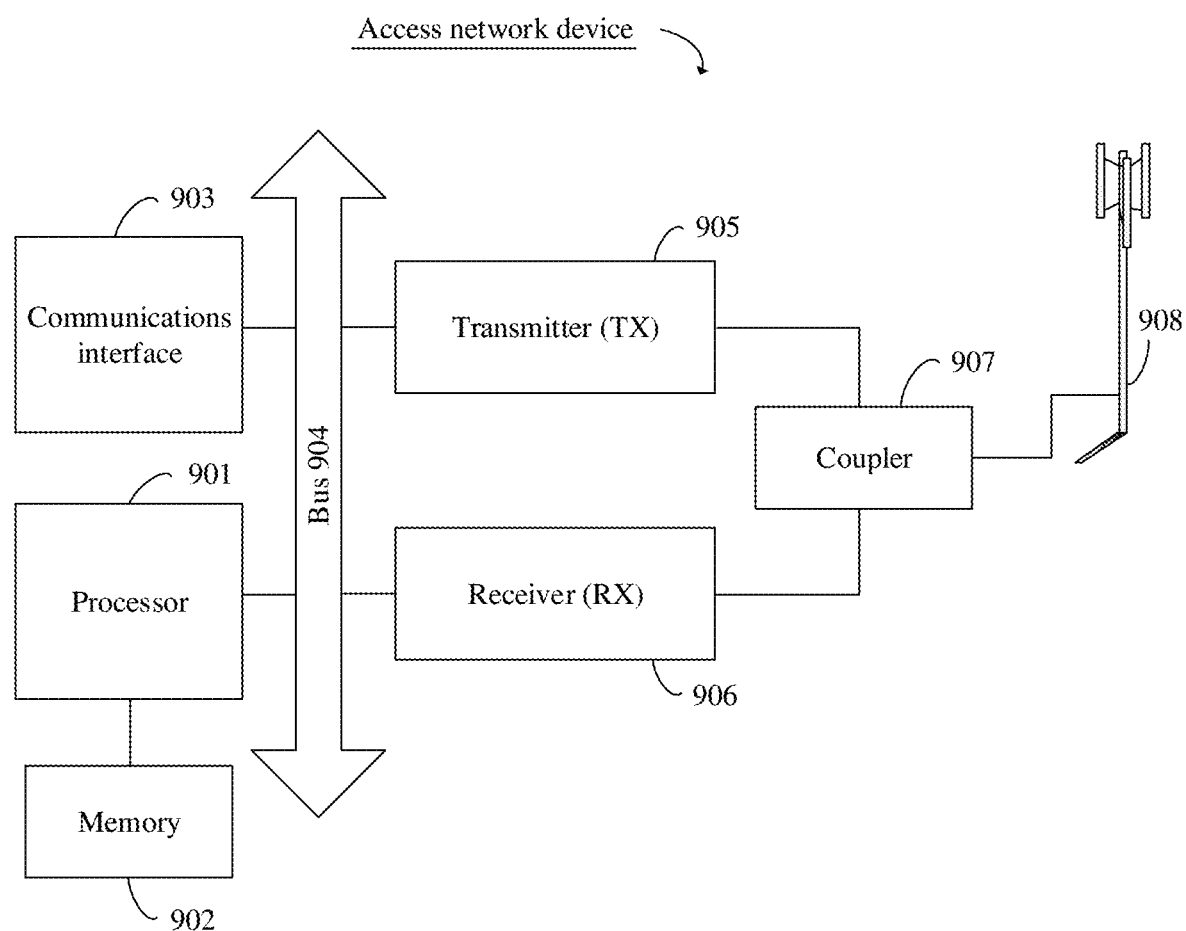
FIG. 9 is a schematic structural diagram of another access network device according to an embodiment of the present invention.

FIG. 9 is a schematic structural diagram of another access network device according to an embodiment of the present invention. The access network device described in this embodiment includes one or more processors 901, a memory 902, a communications interface 903, a transmitter 905, a receiver 906, a coupler 907, and an antenna 908. The components may be connected through a bus 904 or in other manners. FIG. 9 uses an example in which the components are connected through the bus.

The communications interface 903 may be used by the access network device to communicate with another communications device, such as a terminal device or another network device. Specifically, the terminal device may be a first terminal shown in this application. Specifically, the communications interface 903 may be a Long Term Evolution (LTE) (4G) communications interface, or may be a 5G or a future new radio communications interface. Not limited to a wireless communications interface, the access network device may further be configured with a wired communications interface 903 to support wired communication. For example, a backhaul link between an access network device and another access network device may be wired communications connection.

The transmitter 905 may be configured to perform transmission processing, for example, signal modulation, on a signal output by the processor 901. The receiver 906 may be configured to perform receiving processing, for example, signal demodulation, on a mobile communications signal received by the antenna 908. In some embodiments of this application, the transmitter 905 and the receiver 906 may be considered as a wireless modem. In the access network device, there may be one or more transmitters 905 and one or more receivers 906. The antenna 908 may be configured to convert electromagnetic energy in a transmission line into an electromagnetic wave in free space, or convert an electromagnetic wave in free space into electromagnetic energy in a transmission line. The coupler 907 may be configured to divide the mobile communications signal into a plurality of signals, and allocate the plurality of signals to a plurality of receivers 906.

The memory 902 is coupled to the processor 901, and is configured to store various software programs and/or a plurality of sets of instructions. Specifically, the memory 902 may include a high-speed random access memory, and may further include a non-volatile memory such as one or more magnetic disk storage devices, a flash memory device, or another non-volatile solid-state storage device. The memory 902 may store an operating system (which is briefly referred to as a system below), such as an embedded operating system including uCOS, VxWorks, RTLinux, or the like. The memory 902 may further store a program, and the program may be configured to communicate with one or more adjuncts, one or more terminal devices, and one or more network devices.

The processor 901 may be configured to manage a radio channel, establish and disconnect a call and a communication link, perform power control on a terminal in this control area, and the like. Specifically, the processor 901 may include an administration module/communication module (AM/CM) (used in a center of speech channel interaction and information exchange), a basic module (BM) (configured to complete call processing, signaling processing, radio resources management, radio link management, and circuit maintenance functions), a transcoder and submultiplexer (TCSM) unit (configured to complete multiplexing/demultiplexing and transcoder functions), and the like.

In this embodiment of the present invention, the processor 901 may be configured to read and execute a computer-readable instruction. Specifically, the processor 901 may be configured to invoke a program stored in the memory 902, for example, a program for implementing the parameter adjustment method provided in one or more embodiments in this application on an access network device side, and perform monitoring a frequency parameter of a cell, if it is detected that the frequency parameter of the cell increases, determining a location relationship between the first terminal and the access network device, where the first terminal is a terminal camping on the cell, and adjusting a target power parameter of the first terminal based on the location relationship between the first terminal and the access network device, so that a radio remote unit power does not exceed a preset power, where the target power parameter is a power parameter other than a cell-specific reference signal power.

It can be understood that, the access network device may be the base station in the parameter adjustment system shown in FIG. 1, may be implemented as a base transceiver station, a wireless transceiver, a basic service set (BBS), an extended service set (ESS), a NodeB, an eNodeB, an access point, a TRP, or the like.

It should be noted that the access network device shown in FIG. 9 is merely an implementation of this embodiment of the present invention. In an actual application, the access network device may further include more or fewer components. This is not limited herein.

It should be understood that this embodiment of the present invention is an entity apparatus embodiment corresponding to the method embodiments, and descriptions of the method embodiments are also applicable to this embodiment of the present invention.

Another embodiment of the present invention provides a computer-readable storage medium, where the computer-readable storage medium stores a program, and when the program is executed by a processor, the following can be implemented monitoring a frequency parameter of a cell, if it is detected that the frequency parameter of the cell increases, determining a location relationship between a first terminal and an access network device, where the first terminal is a terminal camping on the cell, and adjusting a target power parameter of the first terminal based on the location relationship between the first terminal and the access network device, so that a radio remote unit power does not exceed a preset power, where the target power parameter is a power parameter other than a cell-specific reference signal power.

It should be noted that, for a specific process in which the computer-readable storage medium is executed by the processor, refer to the method described in the foregoing method embodiments, and details are not described herein again.

Still another embodiment of the present invention further provides a computer program product including an instruction. When the computer program product is run on a computer, the computer is enabled to perform the method described in the foregoing method embodiments.

The computer-readable storage medium may be an internal storage unit of the terminal described in any one of the foregoing embodiments, for example, a hard disk or a memory of the terminal. The computer-readable storage medium may alternatively be an external storage device of the computer, for example, a removable hard disk, a smart memory card (SMC), a secure digital (SD) card, or a flash card equipped on the computer. Further, the computer-readable storage medium may further include both the internal storage unit of the terminal and the external storage device. The computer-readable storage medium is configured to store the program and other programs and data that are required by the terminal. The computer-readable storage medium may be further configured to temporarily store data that has been output or is to be output.

Based on a same inventive concept, a principle of resolving a problem by a computer provided in this embodiment of the present invention is similar to the method embodiments of the present invention. Therefore, for implementation of the computer, refer to the implementation of the method. For brevity, details are not described herein again.

An embodiment of this application further provides a computer program product. When the computer program product is run on a computer, the computer is enabled to perform the implementations shown in the foregoing method embodiments.

A person of ordinary skill in the art may understand that all or some of the processes of the methods in the embodiments may be implemented by a program instructing relevant hardware. The program may be stored in a computer-readable storage medium. When the program is run, the processes of the methods in the embodiments may be included. The foregoing storage medium may be a magnetic disk, an optical disc, a read-only memory (Read-Only Memory, ROM), a random access memory (Random Access Memory, RAM), or the like.

What is claimed is:

1. A method, comprising:
monitoring a frequency parameter of a cell;
determining, in response to detecting that the frequency parameter of the cell increases, a location relationship between a first terminal and an access network device, wherein the first terminal is a terminal camping on the cell, and wherein the determining the location relationship comprises:
obtaining a channel quality parameter of the first terminal; and determining the location relationship between the first terminal and the access network device according to the channel quality parameter by performing at least one of:
  determining, in response to the channel quality parameter of the first terminal being greater than a first preset parameter threshold, that a value of a distance between the first terminal and the access network device is less than a first preset distance threshold; or
  determining, in response to the channel quality parameter of the first terminal being greater than a second preset parameter threshold and less than or equal to the first preset parameter threshold, that the value of the distance between the first terminal and the access network device is greater than or equal to the first preset distance threshold and less than or equal to a second preset distance threshold; and
adjusting a target power parameter of the first terminal according to the location relationship between the first terminal and the access network device by at least reducing a transmit power spectral density of the first terminal in response to the value of the distance between the first terminal and the access network device being less than the first preset distance threshold, so that a radio remote unit power does not exceed a preset power, wherein the target power parameter is a power parameter other than a cell-specific reference signal power.

2. The method according to claim 1, wherein the adjusting the target power parameter of the first terminal according to the location relationship between the first terminal and the access network device further comprises:
  increasing the transmit power spectral density of the first terminal in response to the value of the distance between the first terminal and the access network device being greater than or equal to a third preset distance threshold.

3. The method according to claim 1, wherein the target power parameter comprises at least one of a user-level parameter or a demodulation reference signal power; and
  wherein the adjusting the target power parameter of the first terminal according to the location relationship between the first terminal and the access network device further comprises:
    adjusting, in response to the value of the distance between the first terminal and the access network device being greater than or equal to the second preset distance threshold and less than a third preset distance threshold, the at least one of the user-level parameter or the demodulation reference signal power of the first terminal according to a transmission mode of the first terminal.

4. The method according to claim 3, wherein the adjusting the at least one of the user-level parameter or the demodulation reference signal power of the first terminal according to the transmission mode of the first terminal comprises performing at least one of:
  adjusting the user-level parameter in response to the transmission mode of the first terminal being a transmission mode without the demodulation reference signal power; or
  adjusting the demodulation reference signal power in response to the transmission mode of the first terminal being a transmission mode with the demodulation reference signal power.

5. An access network device, comprising:
a processor; and
a non-transitory computer-readable storage medium storing a program to be executed by the processor, the program including instructions to:
  monitor a frequency parameter of a cell;
  determine, in response to detecting that the frequency parameter of the cell increases, a location relationship between a first terminal and the access network device, wherein the first terminal is a terminal camping on the cell, and wherein the instructions to determine the location relationship include instructions to:
    obtain a channel quality parameter of the first terminal; and
    determine the location relationship between the first terminal and the access network device according to the channel quality parameter by performing at least one of:
      determine, in response to the channel quality parameter of the first terminal being greater than a first preset parameter threshold, that a value of a distance between the first terminal and the access network device is less than a first preset distance threshold; or
      determine, in response to the channel quality parameter of the first terminal being greater than a second preset parameter threshold and less than or equal to the first preset parameter threshold, that the value of the distance between the first terminal and the access network device is greater than or equal to the first preset distance threshold and less than or equal to a second preset distance threshold; and
  adjust a target power parameter of the first terminal according to the location relationship between the first terminal and the access network device by at least reducing a transmit power spectral density of the first terminal in response to the value of the distance between the first terminal and the access network device being less than the first preset distance threshold, so that a radio remote unit power does not exceed a preset power, and wherein the target power parameter is a power parameter other than a cell-specific reference signal power.

6. The access network device according to claim 5, wherein the instructions to adjust the target power parameter further include instructions to increase the transmit power spectral density of the first terminal in response to the value of the distance between the first terminal and the access network device being greater than or equal to a third preset distance threshold.

7. The access network device according to claim 5, wherein the target power parameter comprises at least one of a user-level parameter or a demodulation reference signal power; and
  wherein the instructions to adjust the target power parameter further include instructions to adjust, in response to the value of the distance between the first terminal and the access network device being greater than or equal to the second preset distance threshold and less than a third preset distance threshold, the at least one of the user-level parameter or the demodulation reference signal power of the first terminal according to a transmission mode of the first terminal.

8. The access network device according to claim 7, wherein the instructions to adjust the at least one of the user-level parameter the demodulation reference signal power of the first terminal according to the transmission mode of the first terminal include instructions to perform at least one of:
- adjust the user-level parameter in response to the transmission mode of the first terminal being a transmission mode without the demodulation reference signal power; or
- adjust the demodulation reference signal power in response to the transmission mode of the first terminal being a transmission mode with the demodulation reference signal power.

9. A non-transitory computer-readable storage medium, wherein the computer-readable storage medium stores a program, and when the program is executed by a processor of a computer, the computer is enabled to:
- monitor a frequency parameter of a cell;
- determine, in response to detecting that the frequency parameter of the cell increases, a location relationship between a first terminal and an access network device, wherein the first terminal is a terminal camping on the cell, and wherein the computer being enabled to determine the location relationship includes the computer being enabled to:
  - obtain a channel quality parameter of the first terminal; and
  - determine the location relationship between the first terminal and the access network device according to the channel quality parameter by performing at least one of:
    - determine, in response to the channel quality parameter of the first terminal being greater than a first preset parameter threshold, that a value of a distance between the first terminal and the access network device is less than a first preset distance threshold; or
    - determine, in response to the channel quality parameter of the first terminal being greater than a second preset parameter threshold and less than or equal to the first preset parameter threshold, that the value of the distance between the first terminal and the access network device is greater than or equal to the first preset distance threshold and less than or equal to a second preset distance threshold; and
- adjust a target power parameter of the first terminal according to the location relationship between the first terminal and an access network device by at least reducing a transmit power spectral density of the first terminal in response to the value of the distance between the first terminal and the access network device being less than the first preset distance threshold, so that a radio remote unit power does not exceed a preset power, and wherein the target power parameter is a power parameter other than a cell-specific reference signal power.

10. The non-transitory computer-readable storage medium according to claim 9, wherein the computer being enabled to adjust the target power parameter further comprises the computer being enabled to increase the transmit power spectral density of the first terminal in response to the value of the distance between the first terminal and the access network device being greater than or equal to a third preset distance threshold.

11. The non-transitory computer-readable storage medium according to claim 9, wherein the target power parameter comprises at least one of a user-level parameter or a demodulation reference signal power; and
- wherein the computer being enabled to adjust the target power parameter further comprises the computer being enabled to adjust, in response to the value of the distance between the first terminal and the access network device being greater than or equal to the second preset distance threshold and less than a third preset distance threshold, the at least one of the user-level parameter or the demodulation reference signal power of the first terminal according to a transmission mode of the first terminal.

* * * * *